Figure 14:
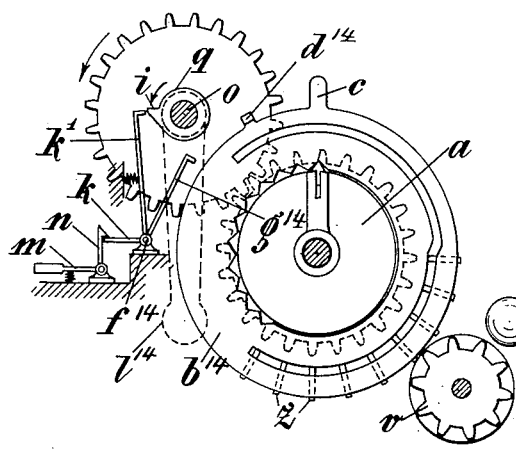
Figure 16:
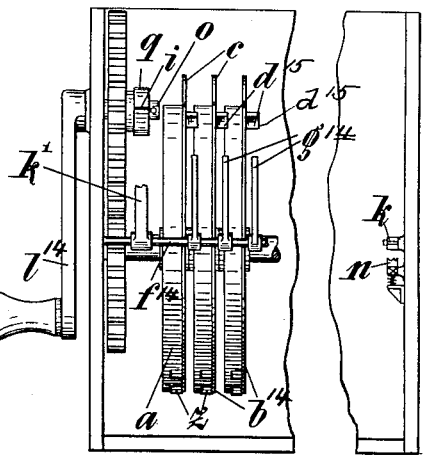
Figure 15:
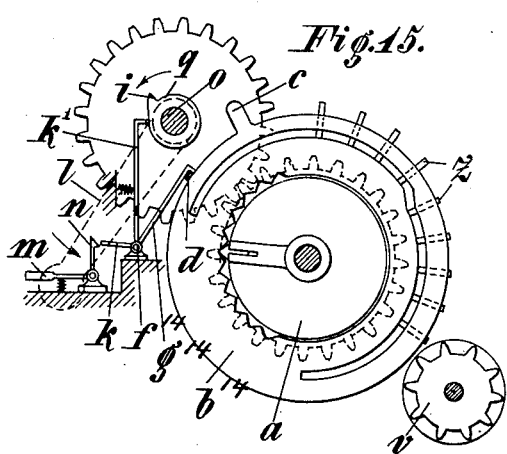

No. 823,375. PATENTED JUNE 12, 1906.
F. TRINKS.
CALCULATING MACHINE.
APPLICATION FILED FEB. 2, 1905.
5 SHEETS—SHEET 1.
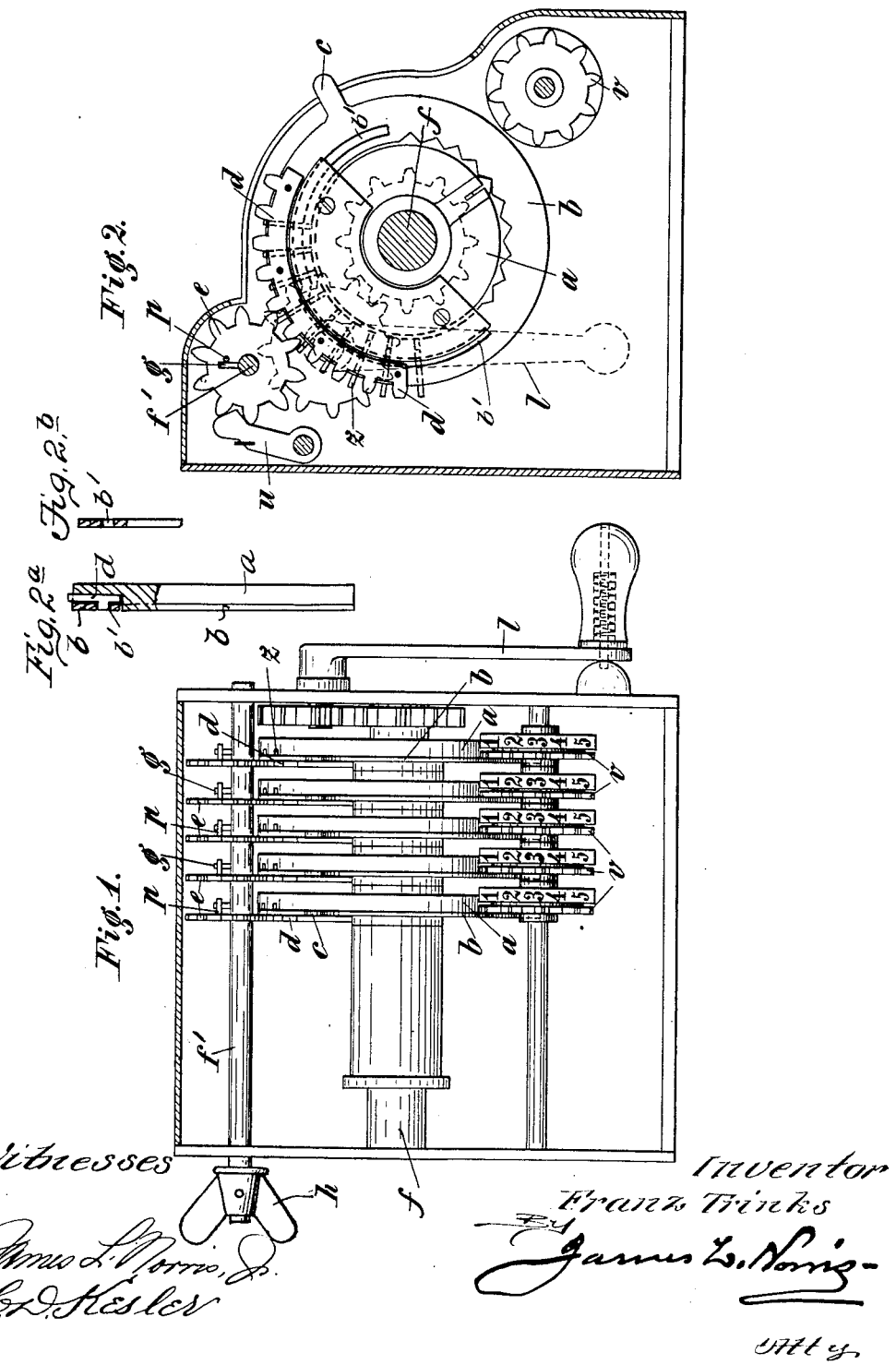

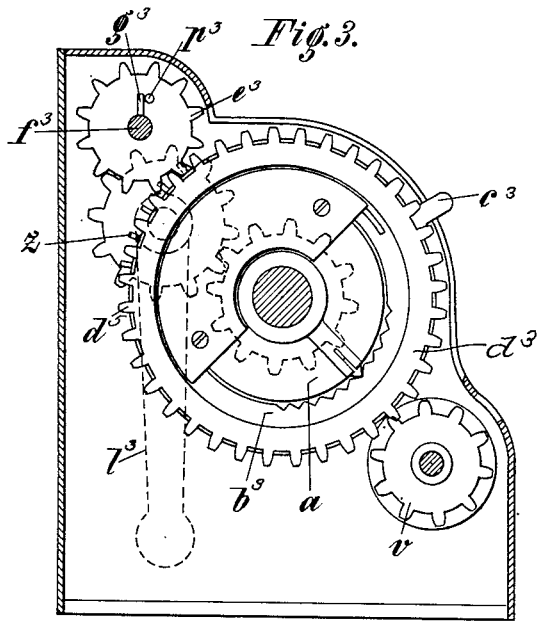
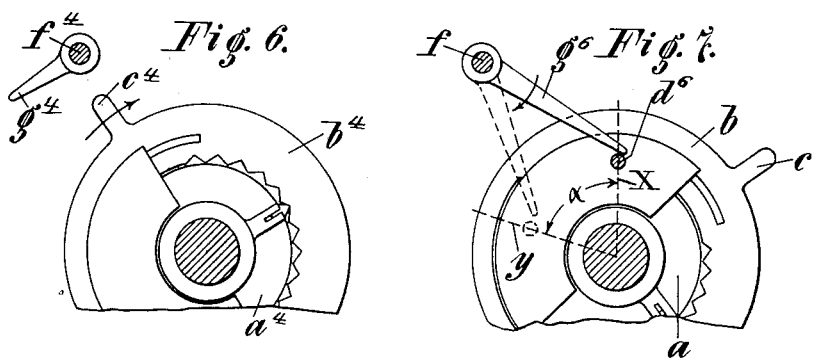
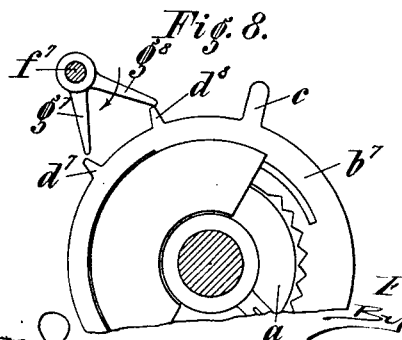

No. 823,375. PATENTED JUNE 12, 1906.
F. TRINKS.
CALCULATING MACHINE.
APPLICATION FILED FEB. 2, 1905.
5 SHEETS—SHEET 3.
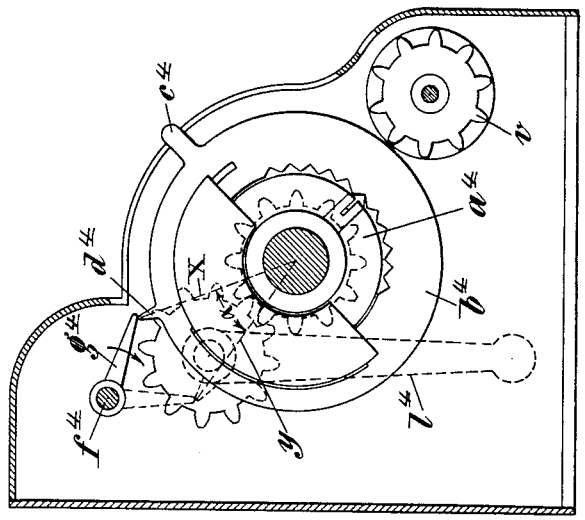
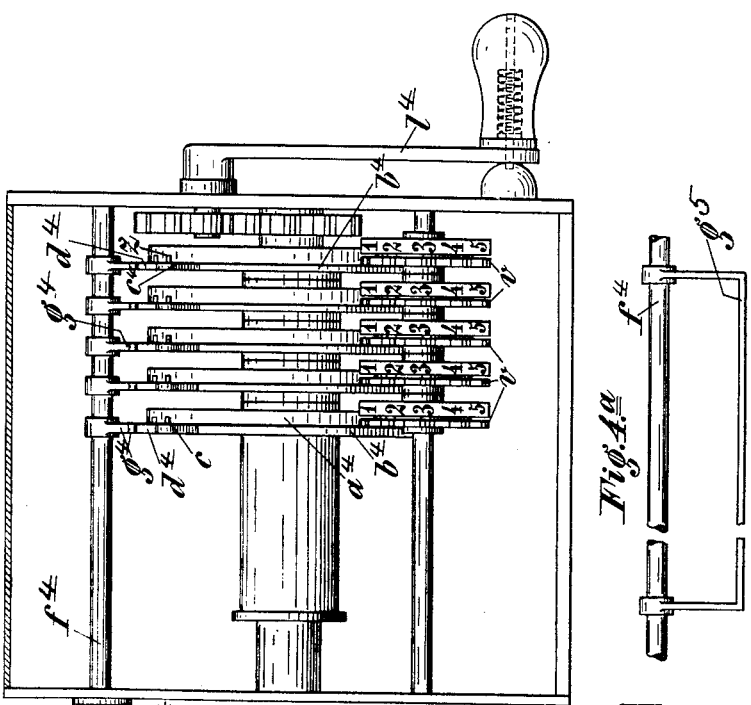

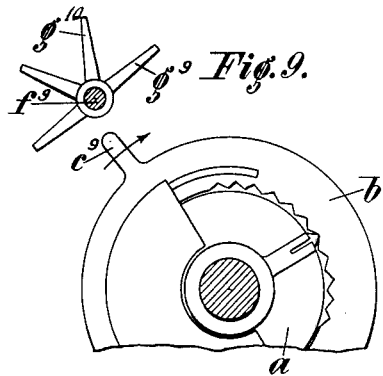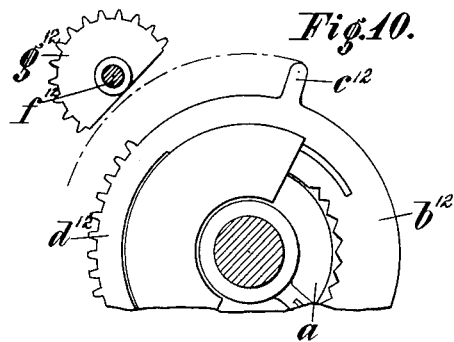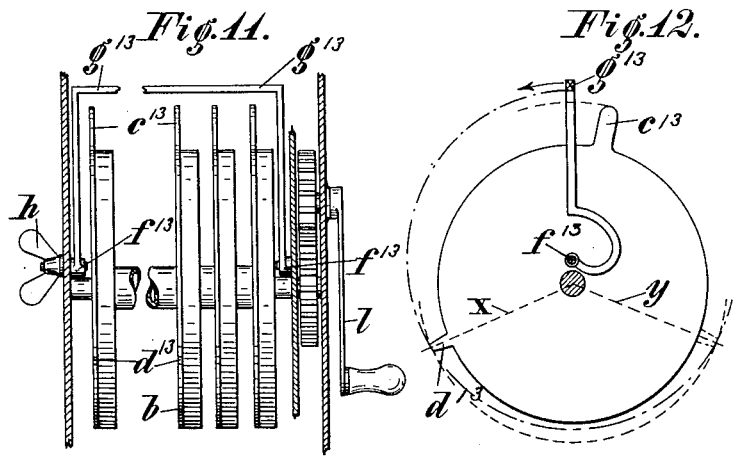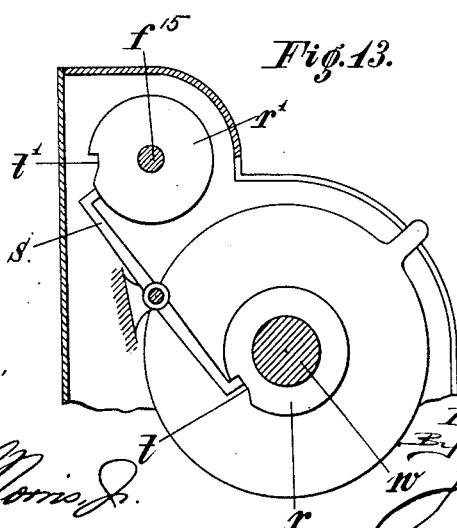

Witnesses:
James L. Norris, Jr.
C. F. Kesler

Inventor
Franz Trinks
By James L. Norris
Atty.

UNITED STATES PATENT OFFICE.

FRANZ TRINKS, OF BRUNSWICK, GERMANY.

CALCULATING-MACHINE.

No. 823,375.　　　　Specification of Letters Patent.　　　Patented June 12, 1906.

Application filed February 2, 1905. Serial No. 243,867.

*To all whom it may concern:*

Be it known that I, FRANZ TRINKS, engineer, a subject of the German Emperor, residing at Brunswick, Duchy of Brunswick, Empire of Germany, have invented certain new and useful Improvements in Calculating-Machines, of which the following is a specification.

This invention relates to calculating-machines of that class in which the operation of the registering-wheels is had through the medium of adjustable disks carrying ratchet-teeth; and the object of the invention resides in providing means hereinafter specifically referred to for returning simultaneously the disks to zero position for the next operation of the registering-wheels.

The invention further resides in providing the machine with a locking mechanism to prevent the operation of the registering-wheels unless the disks have been returned to zero position after the preceding operation of the registering-wheels.

The invention further aims to provide a calculating-machine to attain the foregoing objects which shall be simple in its construction, strong, durable, efficient in its use, and comparatively inexpensive to manufacture.

With the foregoing and other objects in view the invention consists of the novel construction, combination, and arrangement of parts hereinafter more specifically described, illustrated in the accompanying drawings, which form a part of this specification, and particularly pointed out in the claims hereunto appended.

In describing the invention in detail reference is had to the accompanying drawings, wherein like reference characters denote corresponding parts throughout the several views, and in which—

Figure 1 is a front view of a calculating-machine constructed in accordance with this invention with the cover of the casing removed. Fig. 2 is a side view with the corresponding side wall removed. Figs. 2$^a$ and 2$^b$ are sectional details. Fig. 3 is a view similar to Fig. 2 of a modification. Fig. 4 is a front view of another modified form with the cover removed. Fig. 4$^a$ is a detail view of another modification. Fig. 5 is a side view of the apparatus as shown in Fig. 4 with the side wall removed. Figs. 6 and 7 are details of Figs. 4 and 5. Figs. 8 to 12 are further modifications. Fig. 13 is a sectional side elevation broken away, showing one form of a locking device to prevent the operation of the disks until they are returned to zero position. Figs. 14 to 17 illustrate modifications of locking mechanisms.

Referring to Figs. 1 and 2 of the drawings, $a$ denotes the rotatable disks, which are provided with the displaceable teeth $z$, and $b$ denotes the adjustable disks, each having a curved slot and which are termed "cam-disks." The disks $b$ are adapted to displace the teeth $z$. The disks $b$ are provided with a handle $c$ to enable the said disks $b$ to be adjusted. The teeth $z$ when adjusted in the proper manner are adapted to engage the toothed wheels, which form a part of the register-wheels $v$. When the teeth $z$ engage the toothed wheels of the register-wheels $v$, said register-wheels are adapted to be rotated. The engagement of the teeth $z$ with the toothed wheels of the register-wheels $v$ is had when the disks $a$ are rotated. Each of the disks $b$ is provided with a toothed sector $d$, and the said sectors $d$ are adapted to be engaged by the toothed wheels $e$, revolubly mounted on a common shaft $f'$, which shaft is displaceable longitudinally. The shaft $f'$ is revoluble and provided with radial pins $g$, which when the shaft $f'$ is rotated through the medium of a wing-nut $h$ encounter axial pins $p$ on the wheels $e$, thus causing the wheels $e$, and with them the cam-disks $b$ to be returned to the zero position during the period when the crank or handle $l$ is at rest. The disks $a$ are suitably mounted upon a shaft $f$, which is rotated through the medium of the handle $l$, as will be evident by reference to the drawings. The reference character $u$ denotes a spring-pawl which is adapted to engage with the wheels $e$, so as to prevent them from moving after the sectors $d$ have passed out of engagement with the said wheels $e$. The spring-power of the pawl $u$ is readily overcome when the wheels $e$ are rotated to return the disks $b$ to zero position.

In Fig. 3 a construction is set up by which the spring-pawls $u$ are dispensed with, and in this connection it will be stated that in lieu of providing the cam-disks $b^3$ with a toothed sector they are each provided with a circular rack $d^3$, so that on the rotation of the handle $l^3$ the zero-position wheels $e^3$ remain constantly in engagement with the teeth of the circular rack $d^3$, and it will be evident that when the parts of the machine are at rest the wheels $e^3$ will not be accidentally displaced, as the teeth of the said wheels are in engagement with the teeth of the circular rack $d^3$.

Provision should be made to enable the projections $p^3$ of the wheels $e^3$ to pass by the pins $g^3$ on the shaft $f^3$ when the construction shown in Fig. 3 is employed, and in this connection it will be stated that any known means can be used for such purpose. For example, the shaft $f^3$ is displaceable longitudinally, so that during the rotation of the wheels $e^3$ in one direction the pins $p^3$ will not engage the pins $g^3$; but when it is necessary to move the disks $b^3$ back to zero position the shaft $f^3$ is so displaced as to cause the pins $g^3$ to engage the projections $p^3$, so that when the shaft $f^3$ is rotated the wheels $e^3$ will also be.

The axial longitudinal displacement of a shaft $f'$ or $f^3$ is performed by hand. In this connection it will be stated that the operator grasps the thumb-notch $h$, secured on either of the shafts $f'$ or $f^3$, and, according to the position of the shaft, moves the same to the right or left, as the case may be, provision for each movement being had owing to the length of either of the shafts $f'$ or $f^3$. (See, by way of example, shaft $f'$, Fig. 1.)

In order to prevent the handle $c^3$ of the cam-disks $b^3$ encountering the toothed wheels $e^3$ when the handle $l^3$ is rotated, the toothed sectors or circular racks are not placed in the same plane as the handle $c^3$. This can be accomplished by securing the sectors or racks to the side of the disks $b^3$, or the disks $b^3$ can be constructed in any suitable manner so as to obtain such purpose.

The constructions hitherto described provide that the auxiliary toothed wheels, so long as no especial mechanism for throwing them out of action is provided, must on the adjustment of the cam-disks and the rotation of the disks $a$ by means of a handle travel with them. Figs. 4 to 12 show forms of constructions which render the mechanism for throwing the toothed wheels out of action unnecessary and also requires no separate transmission mechanism between the wheels and shaft such as the arrangements previously described require. The foregoing objects are rendered possible owing to the fact that the cam-disk when adjusted even to its greatest adjustment is not displaced the extent of a complete revolution, but only in a comparatively small arc. Therefore when it is required to be returned to the zero position the return movement will correspond to the extent of the movement when adjusting. Therefore it suffices that if a revoluble shaft provided with separate shifting teeth $g^4$, Figs. 4 and 5, and each cam-disk $b^4$ be provided with a tooth-like projection $d^4$, by turning the shaft $f^4$ by means of the wing-nut $h^4$ all of the cam-disks $b^4$ will be moved out of the position indicated by $x$ in Fig. 5 and shifted to the position indicated by $y$. Instead of employing the separate teeth $g^4$ a shifting bar $g^5$ may be employed, as shown in Fig. 4$^a$. This arrangement has the advantage that after the return to the zero position has been completed the connection between the driving and the driven parts is completely broken, so that the fresh adjustment of the cam-disks $b^4$ and the rotation of the entire set of disks $a^4$ takes place by means of the handle $l^4$ independently of the shaft $f^4$. The further advantage is also combined with this construction that by rotation of the zero-position shaft $f^4$ the shifting teeth $g^4$, as shown in Fig. 6, may be turned into a position in which the handles $c^4$ of the cam-disks $b^4$ find sufficient room to move past the shaft $f^4$, so that it is not necessary to place the teeth $g^4$ in other planes than the handles $c^4$. In order to increase the angle formed by the lines $x$ and $y$, or rather the respective arc, the toothed projections $d^6$ may also be placed laterally on the cam-disk near their axis of rotation and the shifting tooth $g^6$ suitably prolonged, as shown in Fig. 7. A further means for enlarging the angle is the use of several peripheral projections $d^7$ $d^8$ on the disk $b^7$ and a plurality of shifting teeth $g^7$ $g^8$ on the shaft $f^7$, Fig. 8. If, for instance, the combined action of the shifting teeth $g^7$ with the projection $d^7$ ceases, the action of the arm $g^8$ on the projection $d^8$ commences, so that the angle of rotation is doubled. The same arrangement may be repeated many times, only it is necessary if the handles $c$ and the arms $g^9$ $g^{10}$, &c., lie in the same plane, which is very desirable for the sake of saving space, that these arms shall only inclose the shaft $f^9$ so far that when moved to inoperative position a clearance-space is formed through which the handles $c^9$ may move past the shaft $f^9$, Fig. 9. In Fig. 10 a portion of the periphery of the disk $b^{12}$ is provided with peripheral teeth $d^{12}$, adapted to be engaged by a mutilated sprocket-wheel $g^{12}$, carried on the shaft $f^{12}$. The construction of the wheel $g^{12}$ is such that when said wheel $g^{12}$ is moved to inoperative position a clearance-space will be formed for the handle $c^{12}$ on the disks $b^{12}$. The arrangement shown in Figs. 4, 4$^a$, and 5 may also be modified in such a way that a larger angle of rotation is obtained. If the axis of rotation $f^{13}$ be placed in the interior of the cylinder described by the circular track of the projections $d^{13}$, as indicated as an example in Figs. 11 and 12, the circular courses of the shifting arm $g^{13}$ and the similarly-directed curvature of the projection $d^{13}$ extend in a similar way, so that a combined action over a longer course is possible. In moving in the direction indicated by the arrow, Fig. 12, the arm $g^{13}$ may carry the projection $d^{13}$ with it from the position $x$ into the position $y$, and then in the position of rotation shown the handle $c^{13}$ may still pass under the arm $g^{13}$ on the rotation of the adjusting-disks. To prevent the operation of the cam-disks if the same have not been returned to zero position after a preceding operation and also to compel the operator to adopt zero position for the cam-disks, a means is provided to prevent the operation of the cam-disks after being operated if they have not been returned to zero position. Said means consists of a pair of notched disks $r$ and $r'$, the disk $r$ being secured to the shaft $w$, which carries the cam-disks, and the said disk $r'$ being secured to the shaft $f$. The two-armed lever $s$, having each of its arms terminating in a hook, is adapted to engage in the notch $t$ of the disk $r$ and in the notch $t'$ of the disk $r'$. The lever $s$ rocks in such a way that one of its hooked ends must always lie in one of the notches $t$ or $t'$, while the other hooked end of the lever $s$ is forced out of the notch of its respective disk by the inclined edges of the notch. Therefore if the shaft $f^{15}$ is rotated after the disks have been adjusted one hooked end of the lever $s$ will engage in the notch $t$, and consequently arrest any further movement of the shaft $w$ unless the said hooked end is moved out of the notch $t$. This action is caused by rotating the shaft $f$, which will cause the lever $s$ to rock and have the other hooked end thereof engage in the notch $t'$ and move that hooked end of the lever which is in the notch $t$ out thereof.

The construction illustrated in Fig. 13 is not intended to prevent the operator of the machine from rotating the crank $l$ repeatedly in a continuous manner; but it is intended to prevent the crank $l$ from being actuated before the operation of setting to zero position the curved disk by means of the shaft $f$ has been completed—that is to say, the shaft $w$ can only be turned when the shaft $f$ is in its normal position. The recesses $t$ and $t'$ and the two-armed pivot-lever $s$ are provided for this purpose, which latter always rests in one of the two recesses.

Figure 17:
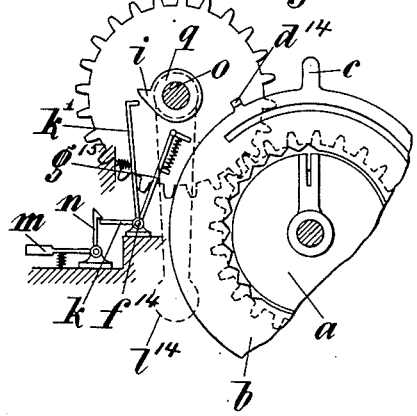

Another form of locking mechanism to obtain the objects set forth in the preceding paragraph is disclosed in Figs. 14 to 17. In this connection the disks $b^{14}$ are provided with a radially-extending projection $d^{14}$ or an axially-extending projection $d^{15}$. These projections are moved in the path of the hooked levers $g^{14}$, which are mounted on a common shaft $f^{14}$ and which are forced through the action of a spring toward the path of the projections $d^{14}$ $d^{15}$. The levers $g^{14}$ are prevented from lying in the path of the projections $d^{14}$ $d^{15}$ through the action of a pawl $n$, engaging over an arm $k$, connected with the shaft $f^{14}$, thus preventing the shaft $f^{14}$ from turning through the action of a spring bearing against the pawl $g^{14}$. If the zero position of the disks $b^{14}$ is to be brought about when adding mechanism has been operated, the arm $k$ is released by means of a hand-lever $m$, and which causes the lever $g^{14}$ to be moved in the path of the projection $d^{14}$ or $d^{15}$, and thereby hold fast the disks $b^{14}$ if the handle $l^{14}$ is turned in the direction indicated by the arrow, and on the further rotation will be turned back into zero position. The release of the lever $g^{14}$ after the reëstablishment of the zero position is caused through the medium of a lift-cam surface $i$ on the disk $q$, which is arranged on the crank-shaft $o$, said cam-surface pushing a lever $k'$, connected with the shaft $f^{14}$ in such a way that the lever $g^{14}$ releases the projection $d^{14}$ or $d^{15}$ and frees the arm $k$, so that the latter can be caught by the pawl $n$. The construction is such that the release of the projection $d^{14}$ or $d^{15}$ takes place exactly at the moment when the cam-disks reach their zero position. This is necessary, on the one hand, to obtain the exactness of the zero position, and, on the other hand, of course, if the release was too late the projection $d^{14}$ or $d^{15}$ of the disks $b^{14}$ would be firmly hooked by the lever $g^{15}$. Fig. 17 shows an arrangement which removes this difficulty. Here the hooks of the levers $g^{15}$ are spring-mounted in such a way that the springs overcome the resistance which the disks $b^{14}$ oppose to their rotation; but on the handle $l^{14}$ being further turned no further possibility of displacement exists for the disks $b^{14}$, as the hooks of the levers yield and slip off the projection $d^{14}$ or $d^{15}$, and this releases them.

Having thus fully described my invention, what I claim as new, and desire to secure by Letters Patent, is—

1. A calculating-machine comprising rotatable disks having displaceable teeth, cam-disks for displacing the teeth, and a shaft bearing means for simultaneously returning the cam-disks to zero position.

2. A calculating-machine comprising rotatable disks having displaceable teeth, cam-disks for displacing the teeth, a shaft bearing means for simultaneously returning the cam-disks to zero position, and means for preventing the operation of the handle before the cam-disks have been returned completely to zero position and to maintain the cam-disks only in zero position when the handle is in its normal position.

3. A calculating-machine comprising rotatable disks having adjustable teeth, shiftable cam-disks for adjusting said teeth, and a shaft bearing means engaging the said disks for returning them to zero position, thereby returning the teeth to normal position.

4. A calculating-machine comprising rotatable disks having adjustable teeth, shiftable cam-disks for adjusting said teeth, a shaft bearing means engaging the said disks for returning them to zero position, thereby returning the teeth to normal position, and means for preventing the operation of the handle before the cam-disks have been returned completely to zero position and to maintain the cam-disks only in zero position when the handle is in its normal position.

5. A calculating-machine comprising register-wheels, rotatable disks provided with adjustable teeth adapted to engage the said register-wheels for rotating them, shiftable disks adapted to adjust the said teeth, and a shaft bearing means for simultaneously returning said disks to zero position.

6. A calculating-machine comprising register-wheels, rotatable disks provided with adjustable teeth adapted to engage the said register-wheels for rotating the shiftable disks adapted to adjust the said teeth, a shaft bearing means for simultaneously returning said disks to zero position, a handle for operating said shaft and means for preventing the operation of the handle before the cam-disks have been returned completely to zero position and to maintain the cam-disks only in zero position when the handle is in its normal position.

In testimony whereof I have hereunto set my hand in presence of two subscribing witnesses.

FRANZ TRINKS.

Witnesses:
JULIUS SECKEL,
WILHELM ZEHRKE